Oct. 20, 1964   J. A. DE FELICE   3,153,617
METHOD OF OPERATING BOILING COOLANT REACTOR WITH
POSITIVE REACTIVITY COEFFICIENT
Original Filed Aug. 19, 1958   3 Sheets-Sheet 2
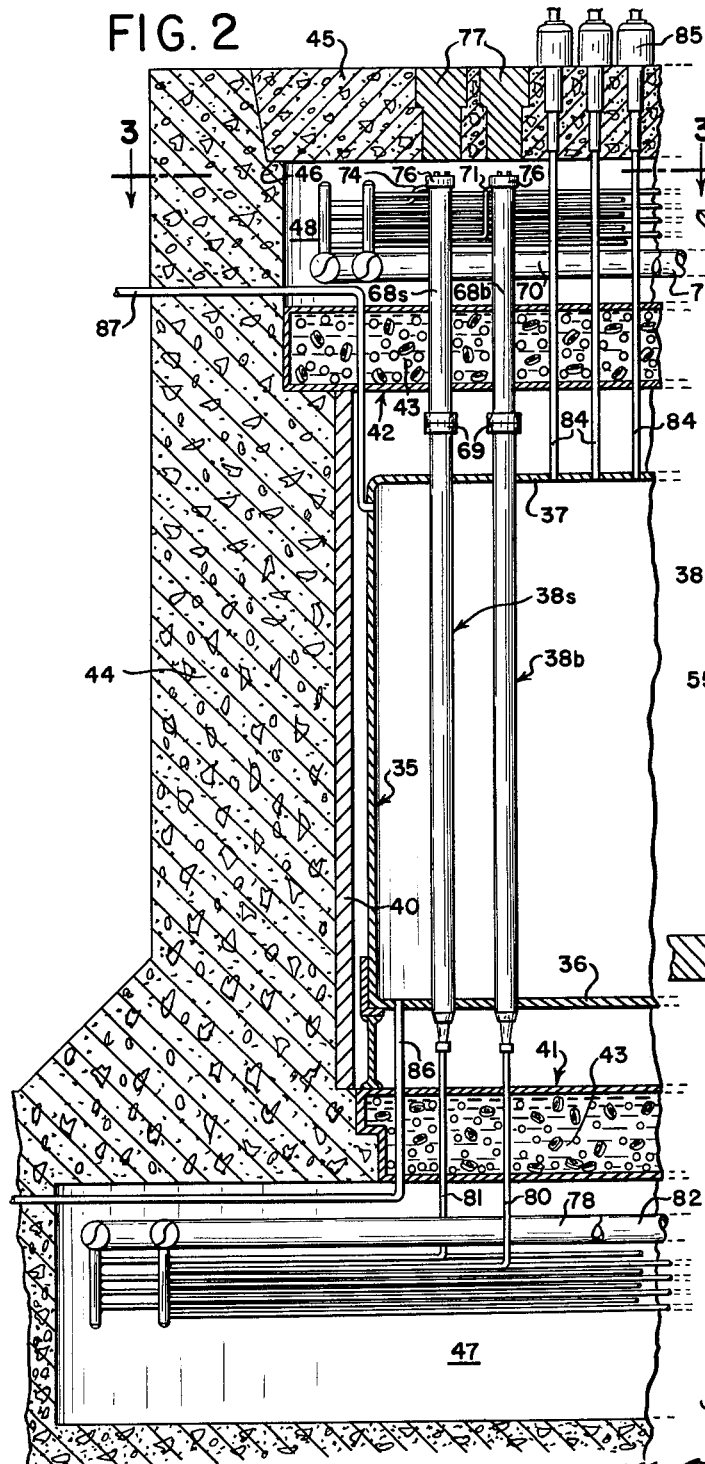
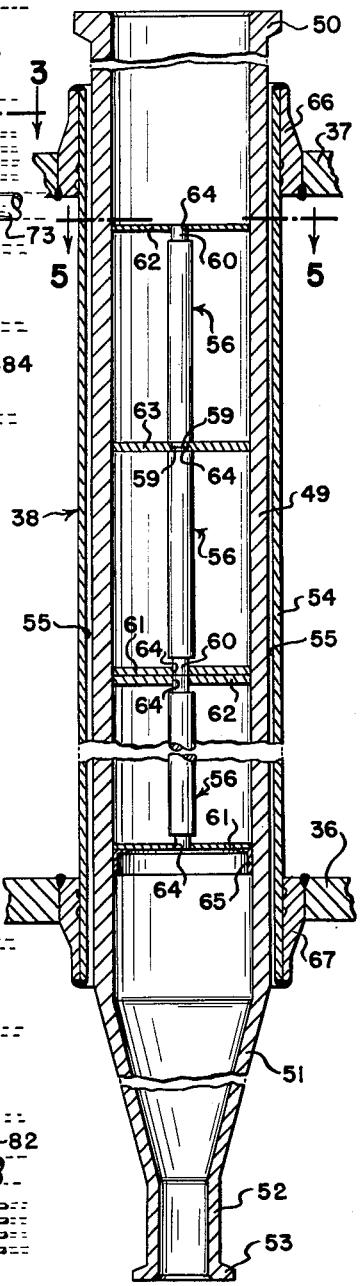
INVENTOR
Joseph A. De Felice
BY
ATTORNEYS

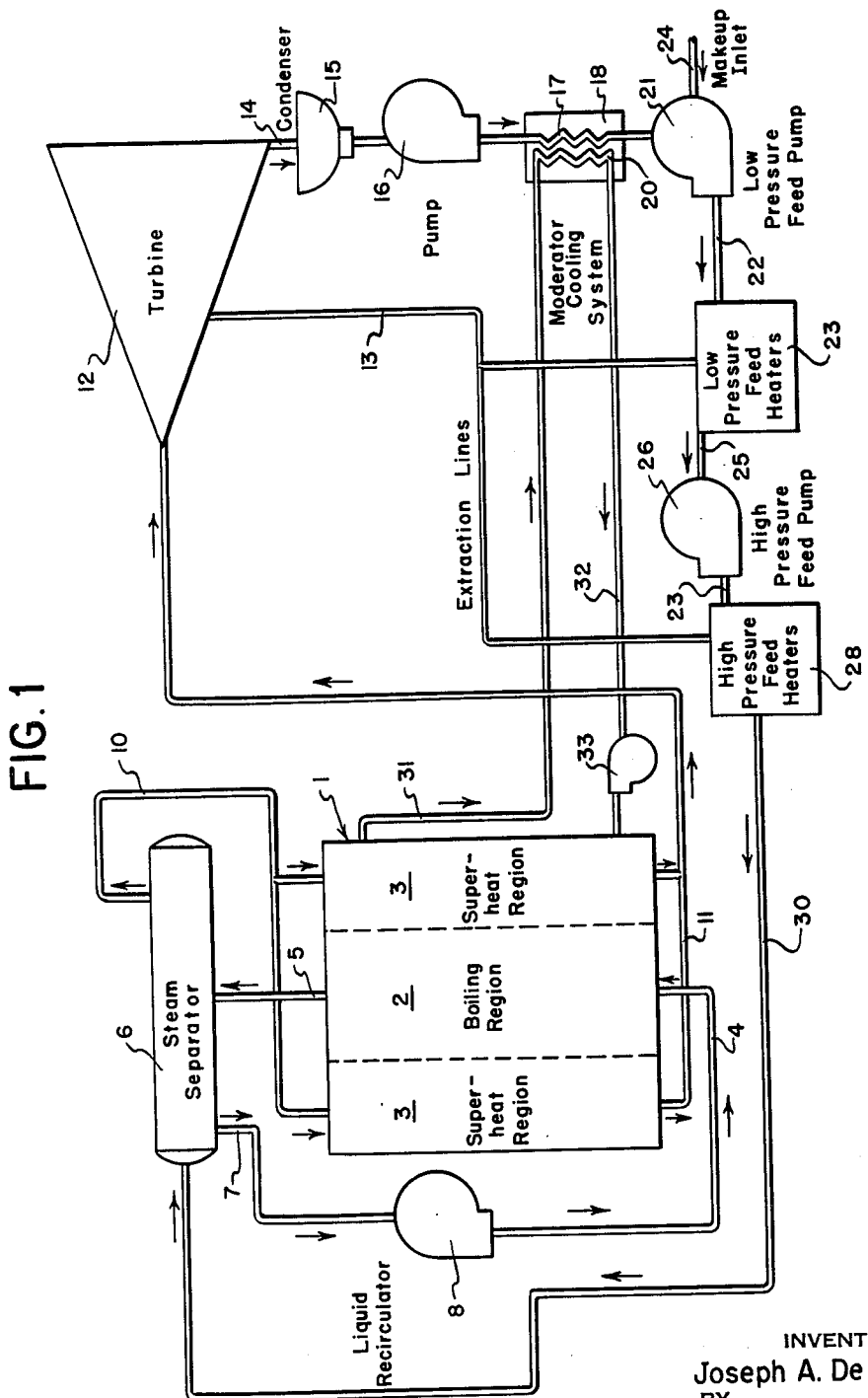

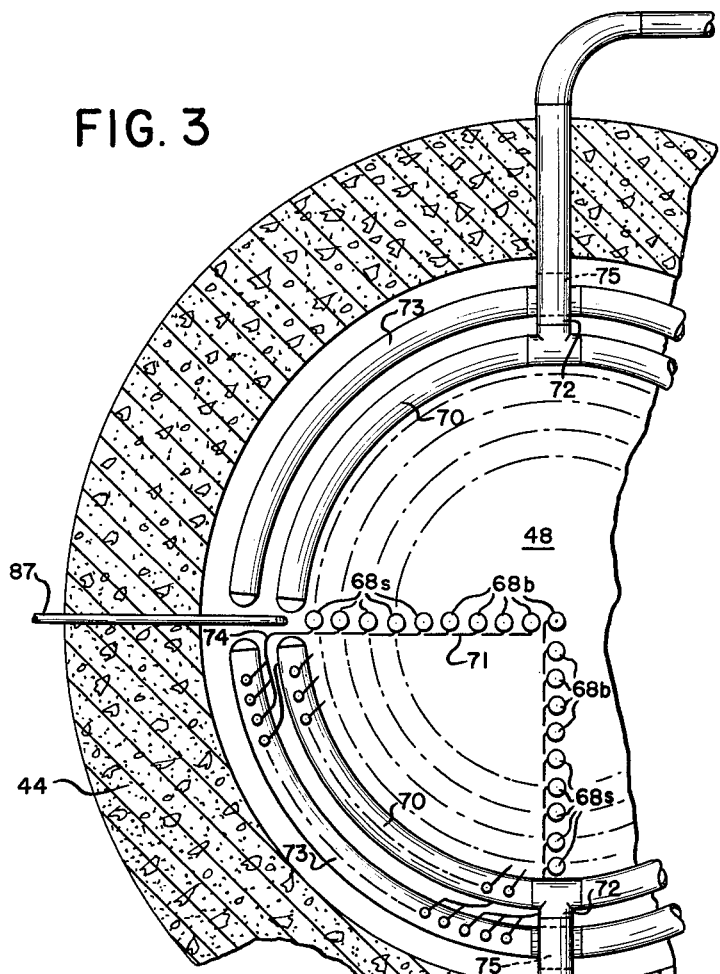
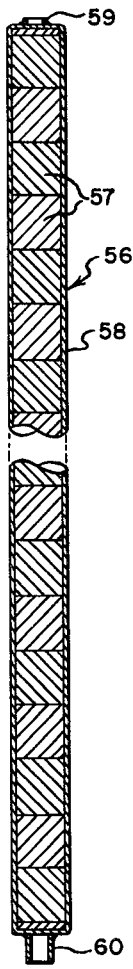
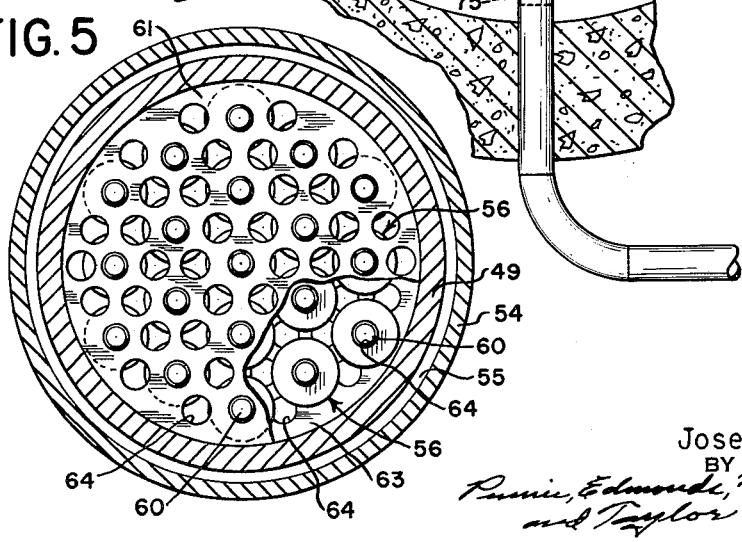
INVENTOR
Joseph A. De Felice

3,153,617
METHOD OF OPERATING BOILING COOLANT REACTOR WITH POSITIVE REACTIVITY COEFFICIENT

Joseph A. De Felice, Irvington, N.Y., assignor, by mesne assignments, to United Nuclear Corporation, New York, N.Y., a corporation of Delaware
Continuation of application Ser. No. 756,016, Aug. 19, 1958. This application June 16, 1960, Ser. No. 36,684
2 Claims. (Cl. 176—20)

This application is a continuation of Serial No. 756,-016, entitled Boiling Superheating Reactor, filed August 19, 1958, and now abandoned.

This invention relates to nuclear reactors in which a fluid which absorbs and transports the heat generated by nuclear fission processes in the reactor fuel generally exists inside the reactor in both the liquid phase and the vapor phase when the reactor is in operation. Reactors of this kind are commonly known as boiling coolant reactors. In particular, this invention relates to a new method for operating boiling coolant reactors. The invention also relates to a method for operating systems which utilize the energy developed by such reactors and more particularly to a method of operating systems in which the energy output of the reactor in the system, i.e., the reactivity of the reactor, follows the variations in demand for energy by the utilization apparatus in the system.

Water cooled reactors in which the cooling water is permitted to boil within the reactor are presently known and they have a number of recognized advantages over nuclear reactors of other types. At least one reactor of this kind which uses ordinary water as both coolant and moderator has been built and operated by the Argonne National Laboratory of the United States Atomic Energy Commission. The advantage of using ordinary water is that it is a familiar substance and its physical characteristics are well known. It is also inexpensive and no special precautions need be taken to prevent large leakage losses. However, a boiling reactor which uses ordinary water as both a coolant and a moderator has several inherent characteristics which are distinctly disadvantageous if the reactor is used to supply steam for a power generating system. The first of these arises from the fact that the water which is the coolant also has a significant moderating or neutron slowing-down function. Thus, whenever the system's demand for steam increases, the pressure in the coolant channels of the reactor decreases and the water coolant flashes into vapor. The consequent reduction in density of the coolant water reduces the moderating ability and the reactivity of the reactor is reduced. The reactor power output goes down accordingly. Conversely, a reduction in demand for steam increases the pressure and, hence, the reactivity. Hence, the response of a reactor is directly opposite to the load demand.

Actually, from the standpoint of safe operation, this characteristic is widely held to be a virtue of known water boiling reactors. The direct consequence is, however, that such a reactor must be operated at substantially constant steam flow rate and, if used in power generating systems, must produce more steam than the turbine or other steam utilization means normally requires. Expected increases in demand are then supplied from the continuously generated excess steam which, when it is not needed, must be bypassed around the turbine and condensed. However, if the turbine requires more steam than that being bypassed at a particular level of operation, it is necessary to increase the heat output of the reactor by repositioning the control rods to increase the reactivity. This is a slow procedure. A power generating system with this limitation is very uneconomical and it is inevitable that there will be intolerable delays in meeting increases in the load imposed on the system.

Another disadvantage of boiling water reactors which use ordinary water as coolant and moderator is the inability to produce high-quality steam. This limitation is based on nuclear considerations. Thus, if the coolant in the reactor contains a high proportion of vapor, then a sudden increase of pressure in the coolant channels due to a decrease in demand for steam or a rapid influx of cooling water will cause a collapse of the vapor bubbles in the coolant channels. The resultant increase in density causes an increase in reactivity. A very real danger is that the reactor may become critical on prompt neutrons alone and destroy itself. The reactor must then be designed and operated so that the percentage of steam in the coolant channels is always less than about 5 percent by volume of the combined liquid and vapor which results in very low-quality steam. In actual practice the water boiling reactor at Argonne National Laboratory operates with approximately 1.5 percent by volume of steam in the coolant channels.

Poor neutron economy is another disadvantage of water boiling reactors in which light water is the moderator and the coolant. As is known, light hydrogen has a relatively high capture cross-section for thermal neutrons. Accordingly, it is not possible to use natural uranium as reactor fuel and more expensive forms of uranium enriched with the rarer isotopes must be used.

Boiling water reactors using heavy water for both moderator and coolant have been designed in an attempt to overcome the poor neutron economy of light water boiling reactors. The neutron economy is improved in such reactors and it is possible to use natural uranium fuel. However, when such reactors are operated in accordance with known methods, the response to changes in demand for steam and the inability to produce high-quality steam are substantially the same as that of reactors which are cooled and moderated by light water. Moreover, the inevitable leakage losses from the coolant system become extremely important economic factors in the operation of the system because heavy water is very expensive.

I have invented a new method of operating boiling coolant nuclear reactors in accordance with which the inability of known boiling reactors to follow the demand for steam is overcome. The new method also improves the neutron economy of boiling water reactors which use light water as a coolant fluid. Further, the new method eliminates the necessity for maintaining at minimal values the vapor-liquid ratio of the coolant in the reactor. This results directly in greatly improved quality of the steam which boiling water reactors can produce. While providing all of these significant and substantial improvements over known methods, my new method also preserves undiminished all of the inherent advantages of known boiling water reactors.

A boiling coolant reactor which may be operated in accordance with my invention comprises a mass of fissionable material such as natural uranium or uranium which has been slightly enriched in the isotope uranium-235. A plurality of coolant conduits or channels are arranged in the mass of fissionable material in heat transfer relation thereto. Means are provided for circulating the coolant through the conduits to absorb heat generated in the fissionable material. Generally, the coolant in the channels will exist partly in the liquid phase and partly in the vapor phase, and means are provided for varying the pressure in the coolant channels to permit substantial variations in the pressure within the coolant channels, thereby varying between wide limits the ratio of vapor to liquid coolant in the channels. A body of neutron slowing-down or moderating substance substantially surrounds the mass of fissionable material and the channels. In accordance with my invention, the coolant and the moderating substances for the reactor are different substances and are selected so that the moderating substance has a moderating ratio which is substantially greater than the moderating ratio of the coolant substance. "Moderating ratio" is here used in its accepted sense to mean the ratio of the slowing-down power of the material to the macroscopic absorption cross-section.

Now, a boiling coolant reactor having the structure and characteristics just stated is operated in accordance with the method of my invention by maintaining the weight of the moderating substance or neutron slowing-down material greater than the weight of the fissionable fuel material. Under varying conditions of operation the weight of coolant in the channels is permitted to vary, but in accordance with the method, sufficient coolant fluid is maintained in the coolant channels such that the weight of coolant, liquid and vapor, is always equal to or in excess of 0.002 times the weight of the slowing-down substance. Further, in accordance with my new method the relative proportions of the fissionable fuel material, moderating substance and coolant fluid, liquid and vapor, in the reactor result in a maximum excess reactivity of the reactor of less than one dollar during the operation of the reactor. Finally, the means for varying the pessure in the coolant channels is operated to increase or decrease the pressure. Upon these means being operated to reduce the pressure in the coolant channels, the average density of the coolant in the channels will be decreased. Conversely, upon the means being operated to increase the pressure in the channels the average density of the coolant in the channels will increase.

Having made express the foregoing structure, characteristics and proportions, it should now be apparent to those skilled in the art that the relative proportions of moderator and coolant in the reactor are selected so that any reduction of the average density of the coolant in the reactor results in a decreased parasitic absorption or capture of neutrons by the coolant with a consequent increase in the reactivity of the reactor. In other words, the reactor would have a positive coefficient of reactivity. It will also be understood that when boiling coolant reactors are operated according to my new method, the predominant function of the coolant in the nuclear reaction is to capture neutrons and eliminate them from the fission reaction; that is, the coolant acts as a neutron poison. Because the ability of a particular material to capture neutrons increases with increasing density of the material, the coolant, which generally exists partly in vapor phase and partly in liquid phase in my new reactor, will capture more or less neutrons depending on the relative proportions of vapor and liquid in the coolant channels. Thus, when steam demand increases and the pressure is reduced, the coolant boils or flashes to vapor, the density is reduced and reactivity rises. The reactor then produces more heat to meet the increased demand. Conversely, as the demand for steam decreases the pressure within the coolant channels increases. The proportion of vapor to liquid is decreased. The capacity of the coolant in the channels to absorb neutrons is increased with a consequent decrease in reactivity and reactor power.

A direct result of this new operating characteristic is that the quality of the vapor produced by the reactor is not limited by nuclear considerations, for as the coolant density increases the net result is that the number of neutrons capable of causing fission is reduced. Therefore, the reactor may be designed and safely operated without providing for some absolute minimum of liquid coolant in the channels as must be done in boiling water reactors which use ordinary water for both moderator and coolant.

Power producing systems utilizing boiling coolant reactors operated in accordance with my invention are capable of economically and efficiently producing high-temperature and high-pressure steam from strictly nuclear heat sources or from combined nuclear and chemical heat sources. In this new system the boiling coolant reactor is used to produce high-quality steam having a temperature which is less than the temperature ultimately required by the turbine or other utilization apparatus in the system. The wet steam produced by the boiling coolant reactor is then separated into liquid coolant and saturated vapor coolant. The saturated vapor is superheated to the desired temperature by a suitable nuclear reactor or by a chemical fueled superheater and the liquid coolant is returned to the boiling coolant reactor.

If a nuclear reactor is used as a superheater it may be integral with the boiling coolant reactor or it may be a separate reactor of the gas cooled type in which the coolant exists only in the vapor or gaseous phase. The superheated steam may be raised to any desired temperature and pressure and there are suitable reactors presently available for raising the temperature of the steam to 1000° F. and the pressure to 2000 lbs./sq. in. The superheated steam is used to drive a turbine or other heat absorbing apparatus. Suitable accessory devices such as pumps, condensers and preheaters would, of course, be included in the coolant circuit.

By utilizing my invention in a power producing system of the kind described the system is self-regulating over a wide range of load demand. The entire system follows the demand for steam by the turbine, i.e., the changes in pressure at the throttle of the turbine, contrary to the behavior of systems utilizing the boiling water reactors known prior to my invention. As the turbine throttle is opened and pressure in the system ahead of the throttle goes down, the reactivity of the water boiling reactor will increase to supply additional steam. On the other hand, when the turbine requires less steam and the throttle is closed, the increase in pressure in the system ahead of the throttle causes the reactivity of the boiling coolant reactor in my new power system to decrease with the result that less steam is produced.

To enable those skilled in the art to understand my invention I describe in detail in the specification which follows a power producing system incorporating a coolant boiling reactor to be operated in accordance with the method of my invention. In the course of the description, reference is made to the accompanying drawings, in which:

FIG. 1 is a schematic illustration of a power producing system which utilizes a boiling coolant reactor as the primary source of heat;

FIG. 2 is a partial elevation in section of a combined boiling coolant and gas or vapor cooled reactor for the system shown in FIG. 1;

FIG. 3 is a partial sectional view taken along the line 3—3 of the reactor shown in FIG. 2;

FIG. 4 is an elevation in section which shows the detailed construction of a fuel and coolant tube for the reactor shown in FIG. 2;

FIG. 5 is a section taken along the line 5—5 of the fuel and coolant tube shown in FIG. 4; and FIG. 6 is an elevation in section of a fuel rod used in the tube shown in FIG. 4.

The reactor and power producing system shown in the drawings and described in the following specification to illustrate the new method of the present invention are the reactor and system described and claimed in my copending application Serial No. 756,016, now abandoned, filed August 19, 1958, and entitled Boiling Superheating Reactor.

FIG. 1 is a schematic diagram. At 1 there is indicated a nuclear reactor which is the primary heat source in the system. The reactor is generally cylindrical and comprises a lattice of fuel tubes having coolant passages therethrough. As will be explained below the coolant passages in the central portion of the lattice are connected in parallel and comprise the boiling region 2 of the reactor while the coolant passages of the fuel tubes which surround the central boiling region are connected in parallel and comprise the superheat region 3. The reactor coolant fluid, which also serves as the working fluid for the entire system, is ordinary water which generally exists in the boiling region of the reactor partly in liquid phase and partly in gaseous or vapor phase. In the superheat region of the reactor the ordinary water coolant exists only in the vapor or gaseous phase.

Ordinary water in liquid form is introduced into the boiling region 2 of the reactor through the inlet pipe 4. Within the boiling region of the reactor the water is boiled due to its absorption of heat produced by a nuclear fission reaction. Relatively high-quality steam is delivered to the outlet pipe 5 at the top of the boiling region 2 and is passed into a conventional steam separator 6 which separates saturated water vapor from liquid water. The liquid water is returned to the inlet of the boiling region of the reactor through the pipe 7, the liquid recirculating pump 8 and the pipe 4.

Saturated vapor from the steam separator is passed to the superheat region 3 of the reactor through the pipe 10 where it is superheated to the desired temperature and pressure. The particular reactor to be described in detail below produces superheated steam which emerges from the reactor at a temperature of approximately 1000° F. and at a pressure of approximately 2000 lbs./sq. in. The superheated steam is delivered through the superheat region outlet pipe 11 directly to the first stage of a utilization device such as a multistage turbine 12. As is customary in modern steam practice some of the steam passing through the turbine is extracted from one or more of the intermediate stages of the turbine through the extraction lines or pipes schematically represented at 13 and is used to preheat feed water.

Steam exhausted from the final or low pressure stage of the turbine is passed through exhaust line 14 to a condenser 15. A pump 16 connected to the outlet of the condenser 15 delivers liquid water at a relatively low temperature to a coil 17 of heat exchanger 18 and there absorbs heat from the coil 20 of the heat exchanger. This has the dual purpose of efficiently utilizing reactor heat which would otherwise be wasted and of preheating the water before it is returned to the boiling region of the reactor. The source of this otherwise wasted heat is the reactor moderator which is heavy water in this illustrative embodiment of the invention. Heat is generated in the heavy water due to its absorption of neutrons and gamma rays. The moderator also receives some heat from the coolant channels of the reactor by conduction and radiation. Inasmuch as the moderating efficiency of heavy water decreases as its temperature increases provision is made for continuously removing heat from the moderator. A pipe 31 delivers heated moderator or a transfer fluid heated by the moderator to the coil 20 of heat exchanger 18 where the heat is absorbed by the feed water in the coil 17. The cooled moderator or transfer fluid is then returned through pipe line 32 to the inlet of the reactor moderator tank. A pump 33 in the return line 32 provides the pressure required to circulate the moderator or transfer fluid.

Returning now to the description of the main coolant and working fluid circuit, the overall thermal efficiency of the system is further improved by additional preheating of the water in several stages. A low-pressure feed pump 21 receives water from the outlet of the heat exchanger coil 17 and delivers it at a higher pressure through the pipe 22 to one or more low-pressure feed heaters 23. Water required to replace water lost by leakage from the system may also be introduced to the low-pressure feed pump through the make-up inlet pipe 24.

In the low-pressure feed heater 23 the liquid water is heated by steam extracted from the intermediate stages of the turbine through the extraction lines 13 as previously stated. The outlet of the heaters 23 is connected through a pipe 25 to a high-pressure feed pump 26 where the pressure of the water is increased and then delivered through pipe 27 to a high-pressure feed heater 28. There the water absorbs additional heat from steam extracted from the turbine and delivered to one or more high-pressure feed heaters 28 through extraction lines 13. The heated water then flows from the outlet of heater 28 through line 30 to an inlet of the steam separator 6 where it is combined with the liquid water separated from the high-quality steam generated in the boiling region 2 of the reactor. This relatively high temperature feed water flows through the line 7, the pump 8 and the inlet pipe 4 to the inlet of the reactor boiling region. The foregoing describes in general terms a complete coolant and working fluid circuit of a power producing system constructed according to my invention. It is to be understood that other accessory equipment may be required in an actual system but such additional equipment as is found to be useful in actual practice is well known and need not be described.

The operation of the system will be fully described following the detailed description of the reactor itself. It is advisable, however, to keep the description of the entire system in mind while considering details of the reactor, for various aspects of the system are directly attributable to novel characteristics of the reactor and its new method of operation.

Referring now to FIGS. 2 and 3 the reactor is generally cylindrical and comprises a central boiling region and a surrounding superheat region as described in connection with FIG. 1. In this particular embodiment both regions are integral parts of the same reactor, the core of which is contained in cylindrical aluminum or stainless steel tank 35 which is closed at both ends by bottom plate 36 and top plate 37. The axis of this tank is vertical in FIG. 2. Inasmuch as the reactor is substantially symmetrical about this vertical axis only approximately one-half the reactor is illustrated in FIGS. 2 and 3.

The tank 35 encloses a number of fuel tubes arranged in a lattice as best seen in FIG. 3. The fuel tubes in the central region of the lattice comprise the boiling region of the reactor and will be designated 38b. The fuel tubes in the annular region of the lattice surrounding the central region constitute the superheating region of the reactor and will be designated 38s. For simplicity and clarity only one of each of the fuel and coolant tubes 38b and 38s is shown in FIG. 2 and in FIG. 3 only one quadrant of the lattice of tubes 38b and 38s is shown. It is to be understood, however, that the lattice of tubes extends throughout the tank 35. The internal construction of the fuel tubes 38 will be described in detail in connection with FIG. 4. Here it is sufficient to say that the fuel tubes are supported at their lower ends where they pass through holes in the bottom plate 36 and are supported at their upper ends where they pass through holes in the top plate 37.

In the reactor which is being described here to illustrate my invention there are 272 fuel tubes. The fuel tubes are arranged parallel to the axis of the tank 35 in a "square" lattice having a pitch of 13.8 inches; that is to say, the axes of the fuel tubes pass through the intersections of a grid in a plane which is perpendicular to the axis of the tank and which consists of squares 13.8 inches on a side. Of these 272 fuel tubes, 94 tubes in the central section of the lattice comprise the boiling region of the reactor while 178 tubes in the annular section of the lattice which surrounds the boiling region comprise the superheat region of the reactor.

The tank 35 is surrounded by a thermal shield which consists of a vertical steel cylinder 40 and cylindrical steel tanks 41 and 42 for closing the bottom and top, respectively, of the cylinder 40. These tanks are filled with water and steel shot or small ringlets of steel, as indicated at 43.

The reactor is also provided with a biological shield which consists of a thick-walled, substantially cylindrical enclosure 44 made of very dense concrete containing a high proportion of barytes. The top of this enclosure is closed by a removable cover slab 45 of reinforced concrete supported on a suitable annular shoulder 46 recessed into the top of the main concrete enclosure. In the bottom portion of the biological shield structure there is provided a lower header space 47 and between the top tank 42 of the thermal shield and the slab 45 of the biological shield there is an upper header space 48.

The internal construction of the boiling region fuel tubes 38b and of the superheat region fuel tubes 38s is susbtantially the same for both and is shown in detail in FIGS. 4 and 5. The main structural component of each of these fuel tubes is a pressure tube 49 having a uniform diameter throughout most of its length and being made of stainless steel or of Zircaloy, a well-known zirconium alloy consisting mainly of zirconium and 0.5 to 5 percent of tin. Zircaloy is presently the better of these materials in view of its lower neutron absorption cross-section. The tubes in both regions of the reactor must contain pressures of approximately 2000 p.s.i. and should be designed accordingly.

The upper end of the pressure tube is provided with an integral collar 50 for connecting the fuel tube to other piping as will be described below. At the lower end of the pressure tube there is a conical portion 51 which is terminated by a cylindrical portion 52 having a smaller diameter than the main part of the tube. The cylindrical portion 52 is provided with an annular collar 53 for connecting the bottom end of the pressure tube to other piping. Each pressure tube 49 is surrounded throughout the greater part of its length by and is supported within an aluminum calandria tube 54 which is part of the assembly of parts constituting the fuel tube. The calandria tube has an internal diameter which is somewhat greater than the outside diameter of the pressure tube 49. As best seen in FIGS. 4 and 5 this provides an annular insulating gap 55 between the inside of the calandria tube and the outside of the pressure tube. At the top and bottom ends of the calandria tube this gap is open to the spaces between moderator tank 35 and the thermal shield. This entire space and the insulating gaps between all the pressure tubes and their associated calandria tubes are filled with an inert gas such as helium. The thin film of substantially stagnant gas in the insulating gaps 55 provides good insulation between the pressure tubes 49, which is at a relatively high temperature, and the surrounding heavy water moderator.

The design of this particular reactor is based upon natural uranium as the fissionable fuel material. This may be in the form of a metallic uranium, uranium dioxide ($UO_2$) or other known mixtures or compounds of uranium. The basic fuel element is the metal-clad rod 56 shown in FIG. 6. The illustrative embodiment consists of a number of cylindrical pellets 57 of compacted uranium dioxide stacked end to end and enclosed in a thin metal jacket 58. The fuel rods used in the boiling region of the reactor are clad in a thin jacket of Zircaloy. Because of the generally higher temperatures which exist in the superheat region of the reactor the fuel rods which are used there should be clad with stainless steel. The upper end of the jacket 58 is provided with a short, axially extending stud 59 and the bottom end of the jacket is provided with a somewhat longer axially extending stud 60. The differences in lengths of these studs will be explained in the course of the description.

One hundred ninety fuel rods are arranged inside each pressure tube 49 in five end-to-end clusters, each cluster consisting of two end-to-end bundles of nineteen rods each. Although only one cluster is shown in its entirety it is to be understood that each pressure tube has five such clusters in stacked relation within the tube. For purposes of clarity in FIG. 4 only one fuel rod 56 of each bundle is shown. However, FIG. 5, taken along the line 5—5 in FIG. 4, shows the end view of a cluster of rods and the arrangement of all nineteen fuel rods in one bundle is seen.

A typical cluster of rods comprises the two bundles of rods 56 and the associated end support plates 61, 62 and center support plate 63.

Each of the support plates 61, 62, 63 is circular an has substantially the same diameter as the inside diameter of the pressure tube 49. As seen in FIG. 5 the support plates are perforated with a large number of holes 64 in a regular array. Part of the holes in each plate receive the end studs on the fuel rods in a bundle and the other holes allow for passage of coolant liquid or vapor along the pressure tube.

In the typical cluster one bundle of nineteen fuel rods is supported between the end plate 61 and the center plate 63 and the second bundle of nineteen fuel rods is supported between the center plate 63 and the end plate 62. The rods in the two bundles are oriented so that the short studs 59 are inserted into the holes in the center plate 63 and the jackets 58 of the fuel rods are brazed or otherwise fixed to the center plate. The end plates 61 and 62 are then assembled onto the opposite ends of the rods in the cluster by inserting the long studs 60 into the holes in the plates. The rods are not fixed to the end plates. Rather, the studs are allowed to float in the end plate holes to allow for different amounts of axial expansion of the individual fuel rods due to temperature variations while the reactor is operating. Hence, the long studs 60 are made long enough so that no one of them will be pulled out of the end plate under the most extreme condition to be encountered in operation.

As previously stated, there are five clusters of fuel rods arranged end to end in each pressure tube. All five clusters are supported in stacked relation within the vertical pressure tube by the bottom end plate 61 of the lowermost cluster which bears on an annular shoulder 65 formed in the inside wall of the pressure tube at a location above the plane in which the bottom 36 of the moderator tank 35 would intersect the pressure tube. The clusters of fuel rods are not otherwise fixed in the pressure tube so that they may be withdrawn through the upper end of the tube when it is necessary to refuel the reactor.

At the places where the calandria tube 54 of each fuel tube passes through the bottom and top of the moderator tank 35 there are mounting collars 66 and 67 welded to the tube 54 and to the tank as shown in detail in FIG. 4.

As is shown in FIG. 2 the upper and lower end portions of each pressure tube 49 extend outside the moderator tank where they are connected to systems of header piping for distributing and collecting the coolant flowing in the individual pressure tubes. Each tube is locked to a steel steam pipe, indicated at 68b if connected to a fuel tube 38b in the boiling region or at 68s if connected to a fuel tube 38s in the superheat region, by a suitable ring clamp 69 which engages the pressure tube collar 50 and a similar collar on the abutting end of pipe 68b or 68s. The latter pipe extends through the thermal shield tank 42 and into the upper header space 48. In the upper header space there are two systems of header pipes. All of the steam pipes 68b connected to the pressure tubes in the boiling region of the reactor are connected to the inner headers 70 through individual pipes 71. The inner header system in the upper header space is the outlet of the boiling region of the reactor and is connected through pipes 72, corresponding to the pipe indicated schematically at 5 in FIG. 1 to the inlet of the steam separator 6.

In a similar manner all of the steam pipes 68s connected to the fuel tubes 38s in the superheat region of the reactor are connected to header pipes 73 of the outer header system by individual pipes 74 in the upper header space. This outer header system constitutes the inlet to the superheat region of the reactor and is fed saturated vapor from the steam separator 6 in FIG. 1 through pipes 75 which correspond to the pipe 10 shown schematically in FIG. 1.

The upper end of each steam pipe 68b and 68s is closed by a removable cap 76. Directly above each cap there is a removable concrete or steel plug 77 in the cover 45 of the biological shield enclosure 44. Thus, when it is necessary to refuel the reactor the plugs 77 and the caps 76 may be removed and by the use of suitable tools the clusters of fuel rods may be withdrawn and replaced.

The inlet to the boiling region of the reactor is the inner header system comprising the header pipes 78 in the lower header space 47. These pipes are supplied through pipe (not shown) which correspond to the pipe 4 in FIG. 1 and which are similar in all respects to pipes 72 in the upper header space. Individual pipes 81 connect the header pipes 78 to the inlet ends of the pressure tubes in the boiling region.

The outlet from the superheat region is through the outer header system comprising header pipes 82 in the lower header space 47. Each of the fuel tubes in the superheat region is connected through an individual pipe 83 to the header pipes 82 and superheated steam is delivered to pipes corresponding to pipe 11 shown schematically in FIG. 1. Although these pipes are not shown in FIG. 2 they are similar in all respects to pipes 75 shown in FIG. 3.

The overall reactivity of the reactor is controlled by a plurality of control rods 84 made of boron steel or cadmium. These rods are adapted to be driven into or out of the core of the reactor by means of suitable reversible drive motors 85 mounted in the cover 45 of the shield enclosure as shown in FIG. 2. The rods pass through suitable apertures in the tank 42 and the top of the moderator tank 35 and into spaces between the fuel tubes. The function of control rods is well understood and will not be described in detail here.

In an emergency the reactor may be shut down entirely by dumping the moderator fluid through a sufficiently large outlet in or near the bottom of the tank 35. The means for accomplishing this are not shown, but, in view of the high cost of heavy water, a catch basin or tank should be connected to the outlet.

As stated in the description of FIG. 1 it is desirable to provide means for cooling the moderator. In this embodiment of the invention it is possible to circulate the fluid moderator directly to external heat transfer means. An outlet pipe 86 extending through the bottom 36 of the moderator tank and out through the thermal and biological shields corresponds to the pipe 31 in FIG. 1. A moderator return pipe 87 leads in through the biological and thermal shields and connects into the moderator tank. This pipe corresponds to pipe 32 shown schematically in FIG. 1.

If it is not desirable to circulate the moderator itself, heat transfer coils may be immersed in the moderator and connected to the inlet and outlet pipes 86 and 87. Then, any suitable coolant fluid may be circulated in the moderating cooling system.

If, in a different embodiment of the invention, a solid moderator, such as beryllium or graphite, is used, cooling coils may be distributed in the mass of solid moderator to cooperate with a suitable fluid circulating system similar to that actually shown in FIG. 1.

In the following table I have collected in summary form types and quantities of materials and certain of the basic operating characteristics of this illustrative embodiment of my invention.

Table I

A. Reactor core:
  (1) $D_2O$ inventory for core, metric tons _____ 235.
  (2) $UO_2$ inventory, metric tons __ 90.
  (3) Lattice spacing (square pattern), in. _____ 13.8.
  (4) Number of pressure tubes ___ 272.
    (a) Tubes in boiling region __ 94.
    (b) Tubes in superheat region 178.
  (5) Average thermal flux in fuel, neutrons per square centimeter per second _____ $1.9 \times 10^{13}$.
  (6) $D_2O$ tank length (inside dimension) _____ 22 ft. 9 in.
  (7) $D_2O$ tank diameter (inside dimension) _____ 22 ft.
  (8) Active core length _____ 20 ft. 9 in.
  (9) Active core diameter _____ 22 ft.
  (10) Axial reflectors ($D_2O$), ft. __ 1.0.

B. Fuel element:
  (1) Type _____ Clustered solid rods.
  (2) Fuel material _____ $UO_2$.
  (3) Rods per fuel bundle _____ 38 (two 19-rod clusters in series).
  (4) Fuel pellet OD, in. _____ 0.75.
  (5) Length of active fuel per rod, in. _____ 24.0.
  (6) Length of fuel rod, in. _____ 24.7.
  (7) Length of fuel bundle, in. ___ 49.4.
  (8) Fuel bundles per tube _____ 5.
  (9) Cladding material:
    (a) Boiling region _____ Zircaloy-2.
    (b) Superheating region ____ 316 SS.

C. Pressure tube:
  (1) Material _____ Zircaloy-2.
  (2) Inside diameter, in. _____ 5.35.
  (3) Outside diameter, in. _____ 6.00.
  (4) Length of Zircaloy tube, ft. __ 25.

D. Heat transfer and fluid flow:
  (1) Reactor power, MW (thermal) _____ 530.
  (2) Boiling region—
    (a) Inlet water temperature, approx. _____ 636° F.
    (b) Outlet steam temperature, approx. _____ 636° F.
    (c) Pressure in boiling region approx. _____ 2000 p.s.i.
    (d) Exit steam quality _____ 50%–90%.
  (3) Superheating region—
    (a) Inlet steam quality _____ 100%.
    (b) Inlet steam temperature, approx. _____ 636° F.
    (c) Outlet steam temperature, approx. _____ 1000° F.
    (d) Pressure in superheat region, approx. _____ 2000 p.s.i.

E. Steam cycle:
  (1) Net electrical power, MW____ 200.
  (2) Turbine inlet pressure, p.s.i.a. 2000.
  (3) Turbine inlet temperature, ° F. 1000.

The essential characteristics of a reactor which is operable in accordance with the method of my invention are all found in the reactor which I have described above. The weight of the moderating substance, heavy water, is within the range of "approximately equal to or greater than" the weight of the fissionable fuel. As can be easily calculated from the information given in Table I the weight ratio of heavy water to uranium is about 2.8 in the illustrative reactor.

It is known that both heavy water (D₂O) and ordinary water (H₂O) have neutron moderating as well as neutron absorbing properties. I have found that an amount of ordinary water in excess of about 0.2 percent by weight of the heavy water will bring about a condition in which the neutron absorbing properties of the ordinary water predominate over the neutron moderating properties with the result that the ordinary water is effectively a neutron poison in the reactor and that its effect as a poison, that is, its gross absorption of neutrons, is related to and increases with any increase in the weight of light water in the reactor. Then, according to my invention I so design and proportion the reactor that the total weight of ordinary water in the coolant passages around the fuel rods always exceeds about 0.2 percent of the weight of the heavy water. In the reactor described above the minimum is actually approximately 0.4 percent. This minimum amount of ordinary water is present when the quality of the steam in the pressure tubes of the boiling region is high, say, 60 percent, that is, when the proportion of liquid water to vapor is lowest and, hence, the average density of light water in both the vapor and liquid phases is a minimum.

The desired predominance of the neutron absorption effect of the light water is not absolute, but can only obtain when the moderating ratio of the moderating substance in the particular reactor is substantially greater than the moderating ratio of the coolant and when the proportions of the moderating substance and coolant are selected so that any moderating effect of the ordinary water is rendered relatively insignificant as compared with the moderating ability of the moderating substance itself. In the case of heavy water the moderating ratio is 21,000. This is approximately 300 times greater than the moderating ratio of ordinary water which is 70. Given these essential conditions and characteristics, it is then possible for one skilled in the art to proceed to a design for an operable reactor using technique of calculation which are fully described in well-known textbooks.

It is not necessary that the difference between the moderating ratio of the moderating substance and the moderating ratio of the coolant be so great as it is in the case of heavy water and ordinary water. Although the required proportions of moderator and coolant will be quite different, the same considerations will enable one to design and construct an operable reactor using beryllium or graphite as the moderator and ordinary water as the coolant. The moderating ratio of beryllium is 150 and the moderating ratio of graphite is 170. It is to be understood, therefore, that I consider moderating ratios which are as little as twice as great as the moderating ratio of ordinary water to be "substantially greater" and, hence, within the scope of my invention.

Some control must be exercised over the maximum excess reactivity which can obtain in a reactor operated in accordance with the method of my invention so that there is an upper limit beyond which any further reduction in the average density of coolant in the reactor will not cause an increase in excess reactivity. This is simply to insure that the reactor cannot destroy itself by generating more heat than can be absorbed by the cooling system. In the illustrative reactor described above, the various factors which effect the maximum excess reactivity, e.g., quantity of fuel, spacing of fuel elements, kind and amount of neutron absorbers in and about the core of the reactor, the thickness of neutron reflectors, etc., are balanced so that the excess reactivity never exceeds one dollar. As is well known, one dollar of excess reactivity means that the reactor is prompt-critical, that is to say, the reactor is critical on prompt neutrons alone. When the excess reactivity is limited to less than one dollar a reactor is controllable by introducing neutron absorbers into the reactor which limit the number of delayed neutrons entering into the fission reaction. The excess reactivity may therefore be increased by a specified amount over a relatively long time as compared with the time in which excess reactivity would increase by specified amounts if the reactor is prompt-critical or when there is one dollar or more of excess reactivity.

As already stated, a reactor which is to be operated in accordance with the method of my invention should be limited in its design to a maximum excess reactivity which is less than one dollar. Then variations in the number of neutrons absorbed due to variations in the average density of the ordinary water in the reactor will exercise good control of the excess reactivity. The average density of the coolant is directly related to the pressure in the coolant channels and is controlled by any suitable means such as a valve in the outlet side of the coolant circuit, or by variations in demand for steam by a turbine supplied by the reactor. A decrease in the average density of ordinary water in the reactor results in an increase in excess reactivity and the reactor produces more heat. Conversely, an increase in average density of the coolant results in a decrease in excess reactivity and the reactor will produce less heat. Accordingly, the reactor will adjust its excess reactivity and, hence, its rate of heat generation, in a manner directly related to variations in the demand for steam.

Numerous modifications of both the illustrative boiling water reactor and of the illustrative boiling-superheating reactor system which I have used to illustrate the method of my invention will occur to those skilled in the art. For example, in the system the boiling region of the reactor may, in fact, be a separate reactor constructed in accordance with my invention, while the superheat region is an entirely separate reactor of a known type which utilizes a saturated vapor or gas as the water coolant. Designs for such reactors are well known and need not be given in detail here.

It would also be possible to isolate the reactor coolant system from the turbine working fluid system by means of suitable heat transfer apparatus. This would have the effect, however, of reducing the overall efficiency of the system. It will not generally be necessary because the amount of radioactivity carried to the turbine through a directly connected coolant system is not excessive for most purposes.

Moreover, variations of the method itself will occur to those skilled in the art. Therefore, having described a particular reactor which is operable in accordance with the method of my invention and having described the essential characteristics and conditions for its operation in accordance with the method, it should be understood that I do not wish the scope of the invention to be limited to the details of the illustrative reactor or to the details of the method of operation as it is applied to the illustrative reactor. The scope of the invention is defined in the claims.

I claim:

1. The method of operating a boiling coolant nuclear reactor having a mass of fissionable fuel material, a plurality of coolant channels arranged in said mass of fissionable material in heat transfer relation thereto, a fluid coolant in said channels and existing in both the liquid and vapor phases when said reactor is in operation, said reactor also having a body of neutron slowing-down substance substantially surrounding the mass of fissionable material and said coolant channels, the moderating ratio of the slowing-down material being substantially greater than the moderating ratio of the coolant, and means acting to vary the pressure in the coolant channels, which method comprises the steps of maintaining the proportions of fissionable material, neutron slowing-down material and the coolant in the reactor such that the maximum excess reactivity of the reactor is less than one dollar during the operation of said reactor when the average density of the coolant in the reactor is at a minimum, adjusting the coolant in said channels to maintain the weight of the coolant in the channels at any time in excess of at least 0.002 times the weight of said neutron slowing-down material, whereby the neutron absorbing properties of the coolant predominate over the neutron moderating properties and such that said reactor has a positive coefficient of reactivity, and varying the pressure of said coolant within said coolant channels in accordance with the power demand, thereby lowering the vapor pressure of said coolant increasing the reactivity and increasing the pressure of said coolant decreasing the reactivity of the reactor.

2. The method of operating a boiling coolant nuclear reactor having a mass of natural uranium fuel material, a plurality of coolant channels arranged in said mass of natural uranium in heat transfer relation thereto, a water coolant in said channels and existing in both the liquid and vapor phases when said reactor is in operation, said reactor also having a body of heavy water as the neutron slowing-down substance substantially surrounding the mass of natural uranium and said coolant channels, and means acting to vary the pressure in the coolant channels, which method comprises the steps of maintaining the proportions of natural uranium, heavy water and the water coolant in the reactor such that the maximum excess reactivity of the reactor is less than one dollar during the operation of said reactor when the average density of the coolant in the reactor is at a minimum, adjusting the coolant in said channels to maintain the weight of the water coolant in the channels at any time in excess of at least 0.002 times the weight of said heavy water, whereby the neutron absorbing properties of the water coolant predominate over the neutron moderating properties and such that the reactor has a positive coefficient of reactivity, and varying the pressure of said coolant within said coolant channels in accordance with the power demand, thereby lowering the pressure of said coolant increasing the reactivity and increasing the pressure of said coolant decreasing the reactivity of the reactor.

References Cited in the file of this patent
UNITED STATES PATENTS

| | | |
|---|---|---|
| 2,743,224 | Ohlinger | Apr. 24, 1956 |
| 2,806,820 | Wigner | Sept. 17, 1957 |
| 2,936,273 | Untermeyer | May 10, 1960 |
| 2,938,845 | Treshow | May 31, 1960 |
| 2,968,600 | Allen | Jan. 17, 1961 |